United States Patent [19]

Geppaard

[11] Patent Number: 4,656,096
[45] Date of Patent: Apr. 7, 1987

[54] MANUFACTURE OF DRAWN SHEET GLASS

[75] Inventor: Adrianus Geppaard, Mol, Belgium

[73] Assignee: Glaverbel, Brussels, Belgium

[21] Appl. No.: 803,778

[22] Filed: Dec. 2, 1985

Related U.S. Application Data

[63] Continuation of Ser. No. 517,209, Jul. 25, 1983, abandoned.

[30] Foreign Application Priority Data

Jul. 30, 1982 [GB] United Kingdom ............... 8222083

[51] Int. Cl.$^4$ ............................................. C03B 15/06
[52] U.S. Cl. ...................................... 428/426; 65/90;
65/95; 65/196; 65/205
[58] Field of Search .................. 65/90, 196, 202, 204,
65/205, 95; 428/426

[56] References Cited

U.S. PATENT DOCUMENTS

| 1,556,726 | 10/1925 | Slingluff | 65/205 |
| 1,645,053 | 10/1927 | Howard | 65/85 |
| 1,860,044 | 5/1932 | Mambourg | 65/202 |
| 3,523,776 | 8/1970 | McMaster | 65/196 X |

FOREIGN PATENT DOCUMENTS 404004  8/1965  Australia ............................. 65/196

OTHER PUBLICATIONS

Glass Machines, Construction & Operation of Machines for the Forming of Hot Glass, Giegerich et al., pp. 342–361, Springer—Verlag, New York, 1969, (cited by applicant).

Rev. Constructülor Materialetor Constructü—vol. 20, No. 4, 1968—cited by applicant.

*Primary Examiner*—Arthur Kellogg
*Attorney, Agent, or Firm*—Spencer & Frank

[57] ABSTRACT

Molten glass 1 flows continuously from a glass melting furnace 2 to a drawing tank 7 whence the glass is drawn as a continuous ribbon 10 from a slot 11 in a refractory device 12 such as a debiteuse partially immersed in the molten glass.

The center of the slot 11 is spaced from each of upstream 6 and downstream 9 end walls of the drawing tank 7 by at least 550 mm. The debiteuse 12 is preferably spaced from those walls by at least 350 mm.

This promotes and facilitates production of a high yield of glass of a high standard of thickness uniformity and of good planeity.

These advantages are enhanced when the ribbon is passed over a bending roll 13 in a drawing chamber 8 above the drawing tank 7 and thence to a horizontal annealing lehr 14.

26 Claims, 3 Drawing Figures

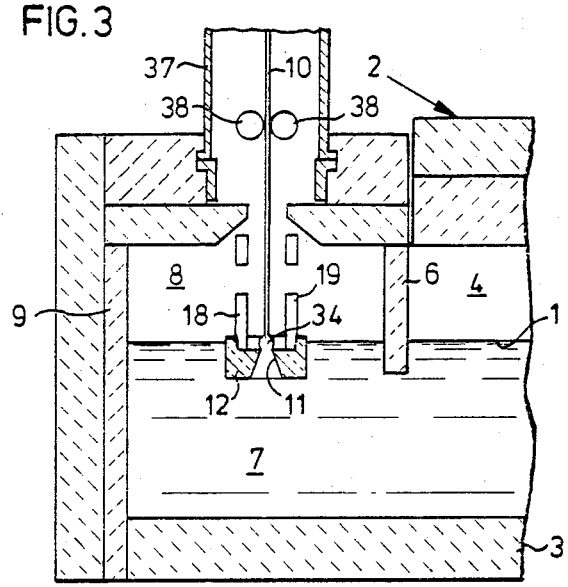
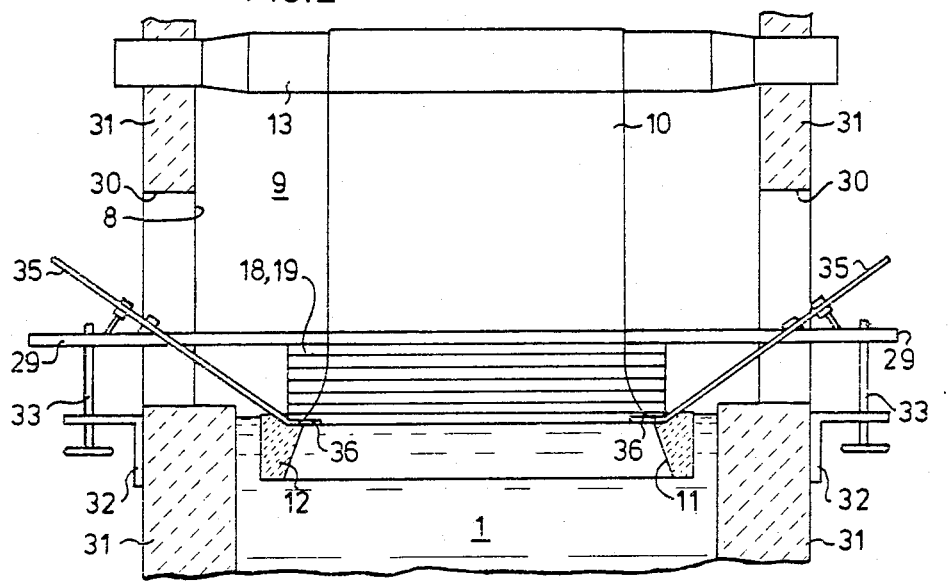

MANUFACTURE OF DRAWN SHEET GLASS

This application is a continuation of application Ser. No. 517,209, filed July 25, 1983, now abandonded.

BACKGROUND OF THE INVENTION

The present invention relates to the manufacture of drawn sheet glass and provides a process and plant for producing drawn sheet glass. The invention includes sheet glass produced using such a process and/or plant.

There are three classical processes for producing a continuous ribbon of drawn sheet glass, namely the Fourcault, the Colburn (or Libbey-Owens) and the Pittsburgh processes, and these date from the first two decades of this century.

These processes may be divided into two categories depending on how molten glass is fed to the root of the ribbon of glass. In the Colburn and Pittsburgh processes the ribbon is fed by surface currents of molten glass held in a drawing tank. In the Fourcault process the glass is drawn from a slot in a one-piece debiteuse of refractory material which is partially immersed in the molten glass in the drawing tank so that glass enters the slot from the depths of the drawing tank to form the ribbon. In a more recent variation of this process, the debiteuse is replaced by a pair of slowly rotating rollers which define the drawing slot.

The present invention is concerned with a sheet glass manufacturing process wherein molten glass formed in a glass melting tank furnace flows continuously to a drawing tank whence the glass is drawn upwardly in the form of a continuous ribbon from a slot defined by a refractory device partially immersed in molten glass in the drawing tank and into a drawing chamber above the tank.

Such below-surface glass drawing processes are recognised to have certain advantages over surface drawing processes such as the Colburn and Pittsburgh processes. For example, when drawing a glass ribbon having a thickness such as is commonly used for window glass, it is generally regarded that the Fourcault below-surface drawing process is easier to run to produce glass of a satisfactory quality as regards its thickness properties. With careful control, the Fourcault process can be used to produce thinner glass than it is possible to manufacture using the Pittsburgh process, and thin glass can be manufactured more easily than when using the Colburn process. It is also known that when using the classical Fourcault process it is easier to control the thickness of the glass produced. This is especially important when manufacturing thin glass.

There are also disadvantages which are associated with the classical Fourcault process, for example certain optical defects are apt to occur in the drawn sheet glass.

Another disadvantage is in the yield and cost of useful glass. The cost of producing drawn sheet glass may be apportioned as follows: the capital cost of the plant; plant maintenance (repair) costs; labour costs; energy costs and raw materials costs. Energy costs may further be divided into the costs attributable to maintaining the plant at its working temperature and the costs attributable to melting the raw materials to form the molten glass. When a given sheet glass production plant is working the only costs which vary significantly with the rate of production of glass are those of the raw material consumed and of the energy required for melting the raw material. It follows that if the yield of useful glass is reduced, the specific cost of producing that glass will be increased.

The yield of useful glass depends in part on the speed of the drawn ribbon. It is known that in the Fourcault process, the drawing speeds utilised are generally lower than in the Pittsburgh and Colburn processes.

The yield of useful glass also depends on the useful width of the drawn ribbon, that is, that part of the ribbon width which meets the desired quaity criteria. In general, marginal portions of the ribbon will not meet these criteria and in practice the ribbon margins are cut off and returned to the glass melting furnace as cullet. When drawing glass through a given debiteuse by the Fourcault process it is known that the useful ribbon width decreases while the low quality ribbon margins increase in width as the glass is drawn to lower nominal thicknesses. This phenomenon becomes particularly important when manufacturing thin glass with the result that wide marginal portions of the ribbon are of unacceptable quality and are only usable as cullet. It would be possible to avoid a large porportion of this waste by drawing the thinner ribbon from a debiteuse having an appropriately shorter drawing slot, but this would only result in savings in the raw material consumed and in the cost of melting it. The useful glass produced would still be of high specific cost. It is also to be noted that changing a debiteuse is a difficult and time consuming process which in itself results in the loss of potential production of drawn glass.

SUMMARY OF THE INVENTION

It is an object of the present invention to provide a process of manufacturing sheet glass in which these disadvantages of the Fourcault process are alleviated.

According to the present invention there is provided a sheet glass manufacturing process wherein molten glass formed in a glass melting tank furnace flows continuously to a drawing tank whence the glass is drawn upwardly in the form of a continuous ribbon from a slot defined by a refractory device partially immersed in molten glass in the drawing tank and into a drawing chamber above the tank, characterised in that the glass is drawn upwardly from said slot while the centre line leading along the slot is spaced from each of upstream and downstream end walls of the drawing tank by a distance of at least 550 mm.

It has been found that by adopting the present invention a number of important advantages can be achieved over a classical Fourcault process.

That these advantages are achieved is surprising in view of the fact that a process according to the present invention departs radically from a long established design criterion for processes in which the ribbon is fed by undersurface currents in the drawing tank.

There must clearly be a continuous flow of molten glass into the bottom of the reducing slot, and in order to encourage this and to provide a direct flow of glass from the melting furnace to the bottom of the drawing slot, it has hitherto been thought necessary to design the drawing tank to restrict the flow of glass in the drawing tank beyond the slot and at a level above the bottom of the slot-defining refractory material. In practice, in all classical Fourcault processes the total length of the drawing tank measured normally to the centre line leading along the slot, that is the distance between the upstream and downstream end walls of the tank, has been restricted to less than about half the minimum distance required by the present invention.

One important advantage which is achieved by the present invention is that glass can be drawn to a given thickess within a narrower tolerance range.

A second important advantage is that the yield of useful glass can be significantly increased. The adoption of the present invention enables a glass ribbon to be drawn with a greater useful width at a given drawing machine particularly when the drawn glass is thin. This reduces the proportion of the ribbon width which is of unacceptable quality and permits greater utilisation of the width of the drawing machine to give a higher yield of useful glass even when drawing very thin glass.

A further advantage of the present invention is that because of the greater length of the drawing tank, the average temperature of the molten glass entering the drawing slot can be maintained at a higher value. Because of this, any tendency for glass to devitrify at the lips of the drawing slot is reduced. This reduces the occurence of a defect typical of the classical Fourcault process known as drawing lines whose presence in the product is undesirable and may be unacceptable.

The advantages referred to which are achieved by the present invention are promoted when either or both of the following optional features is or are adopted.

i. The glass is drawn upwardly from a said slot whose said centre line is spaced from each of said end walls by a distance of at least 700 mm.

ii. The glass is drawn upwardly closer to the downstream end wall of the drawing tank than to the upstream end wall.

The spacing of the drawing slot from the end walls of the drawing tank entails a certain minimum length for the drawing tank to be used in a process according to the invention. This promotes a beneficial flow pattern of currents of molten glass within the drawing tank which tends to ensure that the viscosity of the glass entering the drawing slot is more nearly uniform along its length. By drawing the glass upwardly closer to the downstream end wall of the drawing tank than to the upstream end wall, the path along which molten glass flows to the drawing slot is increased in length for a given length of drawing tank. Glass flowing along such a longer path is found to be better thermally conditioned. Furthermore, because the drawing slot is well spaced from the upstream and downstream end walls of the drawing tank, natural cooling of the molten glass through the walls of that tank will not have such a disturbing effect on the uniformity of the temperature of the glass entering the slot as it does in the classical Fourcault process.

Beneficial flow patterns can be further promoted by adopting one or more of the following preferred features:

iii. Molten glass is fed to the drawing tank from a furnace portion (for example a feed channel or a distribution tank) of substantially the same depth as the drawing tank.

iv. The depth of the glass in the drawing tank is substantially equal to the depth of the glass in the melting tank.

v. The glass within the drawing tank is maintained at a depth of at least 1 meter, and preferably at a depth in the range 1.2 to 1.5 meters inclusive.

It is especially preferred to adopt each of those features. If this is done, it is found that the pattern of currents in the molten glass is favourable for the production of a high yield of glass having good uniformity of thickness and high useful width. The adoption of those features also has a favourable effect in reducing defects in the glass produced. When molten glass flows in contact with refractory tank walls, it can dissovle or scour out material from those walls. The entrainment of such material in the drawn ribbon gives rise to defects. However if the drawing tank is sufficiently deep and if the sole of the drawing tank is at the same level as that of an immediately upstream furnace portion and preferably also the melting tank, a return current of cooler glass will be set up along the sole of the furnace. This return current will be fed by molten glass which has been cooled by contact with side and end walls of the drawing tank with the result that any wall material entrained by the glass which has contacted those walls will return upstream to other parts of the melting furnace. Accordingly, the risk of refractory material from the drawing tank walls entering the ribbon is reduced.

Such a flow pattern affords a further advantage. Because cooler glass is circulating back to upstream parts of the melting furnace, a greater volume of hot molten glass comes into contact with the walls of the drawing tank with the result that for a given rate of heat loss through those walls, the drop in temperature of the molten glass is reduced. This further promotes uniformity of temperature and viscosity of the glass entering the drawing slot leading in turn to an increase in the useful width of the drawn glass, and has a favourable effect in reducing still further any tendency for the glass to devitrify at the drawing slot.

It is also preferred that the glass should flow into the drawing tank over substantially its full width.

In the classical Fourcault process, the continuous ribbon of glass is drawn upwardly into a vertical annealing lehr. The use of a vertical annealing lehr can give rise to difficulties which are well known in the art. For example convection currents of air within a vertical lehr make control of annealing temperatures difficult and gripping forces on the ribbon pulling it upwardly can break it and there is risk of broken glass falling into the drawing tank. Broken glass falling into the drawing tank is particularly objectionable in a classical Fourcault process as it involves high risk of damaging the lips of the debiteuse which define the drawing slot. If the debiteuse is damaged in this way a permanent defect can be introduced into the ribbon when it is redrawn.

Preferred embodiments of the present invention have the feature that said continuous ribbon is folded about a bending roll and then passed to a horizontal annealing lehr. As is well known from experience with the Colburn process, temperature control is easier in a horizontal annealing lehr and there is a markedly lower risk that if the ribbon becomes broken, the glass will fall back into the drawing tank. It is also known that the use of a horizontal lehr reduces any tendency for the ribbon to become curved across its width to lose planeity during annealing.

However the combination of this preferred feature with the present invention affords even greater advantages than would be expected.

A comparison of the glass produced by the two processes showed that this new combination of features had the following advantages over the known Colburn process.

The planeity of the ribbon was even further promoted.

Thinner glass of good quality could be obtained much more easily. Using the Colburn process, glass having a thickness of 0.4 mm has been produced, but only with difficulty and with a low yield. Using this new combination of features, a high yield of glass having the same thickness was produced in the first test with no difficulty and even thinner glass has been drawn. Indeed it is believed that the adoption of this combination of features permits the drawing of a high yield of glass of an acceptable quality which is thinner than can be achieved by any other continuous drawing process and permits doing this easily and reliably.

One difficulty which can arise when folding a glass ribbon about a bending roll is that a transverse fracture may develop in the drawn ribbon between the bending roll and the first conveyor rolls in or leading to the horizontal annealing lehr. Such fracture has occurred in both the known Colburn process and in the new drawing slot process. In both cases the bending roll was driven at a minimum speed, via a clutch so that it could be caused to rotate more rapidly by friction between the circumference of the roll and the drawn ribbon during normal production. In the old process, surface tension effects at the root of the upwardly drawn ribbon and the weight of the vertical portion of the ribbon were sufficient to overcome traction between the bending roll and the ribbon as the roll was driven at its minimum speed so that the ribbon separated at the fracture and the recently formed ribbon fell back into the drawing tank resulting in considerable loss of production. When such fracture occurred using the new process, ribbon separation did not occur, the drawn ribbon continued to advance and the only production loss was very much less. This surprising result has been attributed to the way in which the glass was formed into the ribbon at the drawing slot and will be adverted to later.

Another difficulty which can arise using a horizontal annealing lehr is particularly important when drawing very thin glass. This is loss of traction between the ribbon and conveyor rolls due to the lightness of the ribbon. It is to be noted that if the ribbon speed drops too much, collers between which the ribbon is upwardly drawn can have too great an effect on the ribbon so that it becomes too hard to fold about the bending roll. Slipping between the rolls and the ribbon can be substantially avoided by adopting the present invention so that the desired ribbon speed can be maintained, again, it is believed because of the way in which the glass is formed into the ribbon.

The use of this combination of features also provides considerable advantages over vertical drawing processes using a drawing slot. In particular, ribbon tickness uniformity is yet further promoted, both as regards narrowness of tolerance range and the yield of glass, that is the width over which a given tolerance range can be achieved. For drawing a 2 mm thick ribbon by the classical Fourcault process the usual commercially acceptable thickness tolerance range is 0.2 mm. The adoption of the present combination of features enables the tolerance range for 2 mm glass ribbon to be reduced to ±0.05 mm and this has consistently been achieved over continuous ribbon widths up to 30% greater than by the previously known process. Furthermore, glass ribbon having a nominal thickness of 0.4 mm has consistently been produced with the same uniformity of thickness over a continuous ribbon width up to 50% greater than was achieved by the known process.

A further advantage of the present combination of features over the classical Fourcault process is in the substantial elimination of distortion of the ribbon due to undulation of its margins.

A further advantage over the classical Colburn process is that the glass feeds the ribbon from within the depth of the drawing tank rather than from the surface of the melt. As a result of this, defects in the surface of the melt are not entrained in the ribbon. One cause of such defects is dust or other particles which may be carried back from the annealing lehr to the drawing tank. The entrainment of such particles in a horizonal drawing process is particularly disadvantageous since a single particle can adhere to the bending roll to cause periodical defects in the drawn ribbon. The surface of the molten glass can be affected in other ways. If the surface of the melt is exposed to currents of relatively cool air from the annealing lehr, lack of uniformity of the surface can result and in a surface drawing process this can introduce defects into the drawn ribbon. Also, it is common practice to introduce sulphur dioxide into the annealing lehr. Sulphur dioxide reacts with very hot glass and this also introduces defects into a surface-drawn ribbon. Such defects are substantially avoided when the glass is drawn from within the depth of the drawing tank. In the classical Fourcault process as usually practised, the drawing slot is defined by a debiteuse which is spaced by some 50 mm from the upstream and downstream end walls of the drawing tank. Because of this, the glass between the debiteuse and those end walls stagnates and its viscosity becomes so high that quite soon after first immersion of the debiteuse into the glass at the start of a production run, the level of the debiteuse cannot be adjusted without taking special measures. Because of the much greater spacing between the slot defining refractory device and those end walls made possible by the present invention, the level of the slot defining refractory device can easily be, and preferably is, adjusted during drawing of the glass.

This presents a number of advantages.

The level of said refractory device is preferably so adjusted in order to maintain a convex onion of glass at the top of the slot from which the ribbon is drawn. The glass is thereby pushed through the slot by hydrostatic pressure to form the onion at the ribbon root. The level of the top of the slot can be further adjusted during a production run when it is desired to produce glass of a different thickness in order to maintain such an onion. It is the presence of this onion which reduces tensile forces on the ribbon which is believed to be responsible for the substantial absence of slipping between the drawn ribbon and a bending roll and horizontal conveyor rolls when present, and the adjustability of the level of the slot-defining refractory material enables that advantage to be achieved for different ribbon thicknesses.

A further problem which is encountered in the classical Fourcault process with a non-adjustable debiteuse is as follows. At the start of a run, the slot level can be set give rise to an onion at the ribbon root for drawing a particular thickness of ribbon. During the production run, if it is desired to produce thinner glass this can also be done, but in such a case the ribbon root will descend into the slot leaving upper levels of the slot coated with glass which will soon devitrify. If it is then desired to revert to production of the thicker glass ribbon, the root of the ribbon will rise and that devitrified glass wil be entrained in the ribbon to give rise to serious defects which will render it unacceptable for many purposes.

Adjustability of the level of the drawing slot presents further advantages over the classical glass drawing processes.

In order to produce sheet glass of consistently high quality, it is necessary carefully to control the way in which the glass-forming materials are melted in the melting zone of the tank furnace and this is greatly facilitated if the sheet glass production rate (tonnes per day) is maintained constant.

When glass is drawn from the surface of the drawing tank, for example in the classical Pittsburgh and Colburn processes, the sheet glass production rate (for a given width of ribbon) is influenced by the drawing speed (the ribbon speed), and by the viscosity of the glass forming the ribbon which, together with the ribbon speed, has an influence on the thickness of the ribbon produced.

It has not always been possible to compensate for different desired ribbon thicknesses when operating those processes.

However, when making use of a drawing slot, the sheet glass production rate is governed not only by the viscosity of the glass, but also by the hydrostatic pressure due to a difference between the level of the top of the slot and the level of the molten glass in the drawing tank. Variation of the degree of immersion of the slot-defining refractory device will of course alter this hydrostatic pressure and this permits a constant rate of glass production (tonnes per day) to be maintained over a greater range of ribbon thicknesses than has hitherto been possible. It will be appreciated that, in the classical Fourcault process, it was not in practice possible to vary the level of the debiteuse during production because of the very high viscosity of the glass at the surface of the drawing tank when operating that process.

Adjustability of the level of the slot-defining refractory device is promoted if the glass is drawn upwardly from said slot while leaving a free glass surface in the drawing tank between the slot-defining refractory device and each of the upstream and downstream end walls of the tank which is at least 350 mm long measured in a direction normal to the plane of the upwardly drawn ribbon.

Advantageously the glass is drawn upwardly from said slot while leaving a free glass surface in the drawing tank between the slot-defining refractory device and each of the upstream and downstream end walls of the tank which is at least 500 mm long measured in a direction normal to the plane of the upwardly drawn ribbon.

It is preferred that the heat radiation from the surface of the molten glass within the drawing tank is reflected downwardly in a lower region of the drawing chamber.

The present invention is especially applicable in the production of a glass ribbon drawn to a thickness of 3 mm or less, for example to a thickness in the range 0.4 mm or 2.2 mm.

The present invention extends to plant for the production of sheet glass by a process according to the invention as above defined. The advantages of such plant will readily be inferred from what has been written above in respect of the process of the invention. Accordingly the present invention provides a sheet glass manufacturing plant comprising a glass-melting tank furnace for continuous feeding of molten glass to a drawing tank, means for drawing the glass upwardly into a drawing chamber above the tank as a continuous ribbon from a slot defined by a refractory device partially immersed in molten glass in the drawing tank, characterised in that the centre line leading along said slot is spaced from each of upstream and downstream end walls of the tank by a distance of at least 550 mm.

Such a plant preferably includes one or more of the following optional features:

i. the centre line leading along said slot is so spaced from each of said end walls by a distance of at least 700 mm.

ii. the distance between the upstream end wall and the slot centre line is greater than the distance between the downstream end wall and that line.

iii. a furnace portion for feeding molten glass from the melting tank to the drawing tank has its sole wall at substantially the same level as the sole wall of the drawing tank.

iv. the sole wall of the drawing tank is at substantially the same level as the sole wall of the melting tank.

v. the depth of the drawing taken is at least 1 meter and is preferably in the range 1.2 to 1.5 meters inclusive.

vi. a bending roll is located in the drawing chamber above the drawing tank about which the ribbon can be folded, and a horizontal annealing lehr is provided for receiving the ribbon of drawn glass after its folding about the bending roll.

vii. the slot-defining refractory device is mounted so that its level within the drawing tank is adjustable.

viii. the refractory device defining said slot is spaced from each said upstream and downstream end walls by a distance of at least 350 mm, preferably at least 500 mm.

ix. said slot-defining refractory device is in the form of a one-piece debiteuse.

x. means is provided in a lower region of the drawing chamber for downwardly reflecting heat radiation from the surface of molten glass within the drawing tank.

The slot-defining refractory device may be of a ceramic material as is conventional, or it may be of metal or metal-lined ceramic as proposed in the literature.

The invention includes sheet glass produced by a process and/or using a plant as herein defined.

BRIEF DESCRIPTION OF THE DRAWING

The invention will now be described by way of example only with reference to the accompanying diagrammatic drawings in which:

FIG. 2 is a corresponding sectional end view and

FIG. 3 is a schematic sectional side view of a plant according to an alternative embodiment of the invention.

DESCRIPTION OF THE PREFERRED EMBODIMENTS

Figure 1:
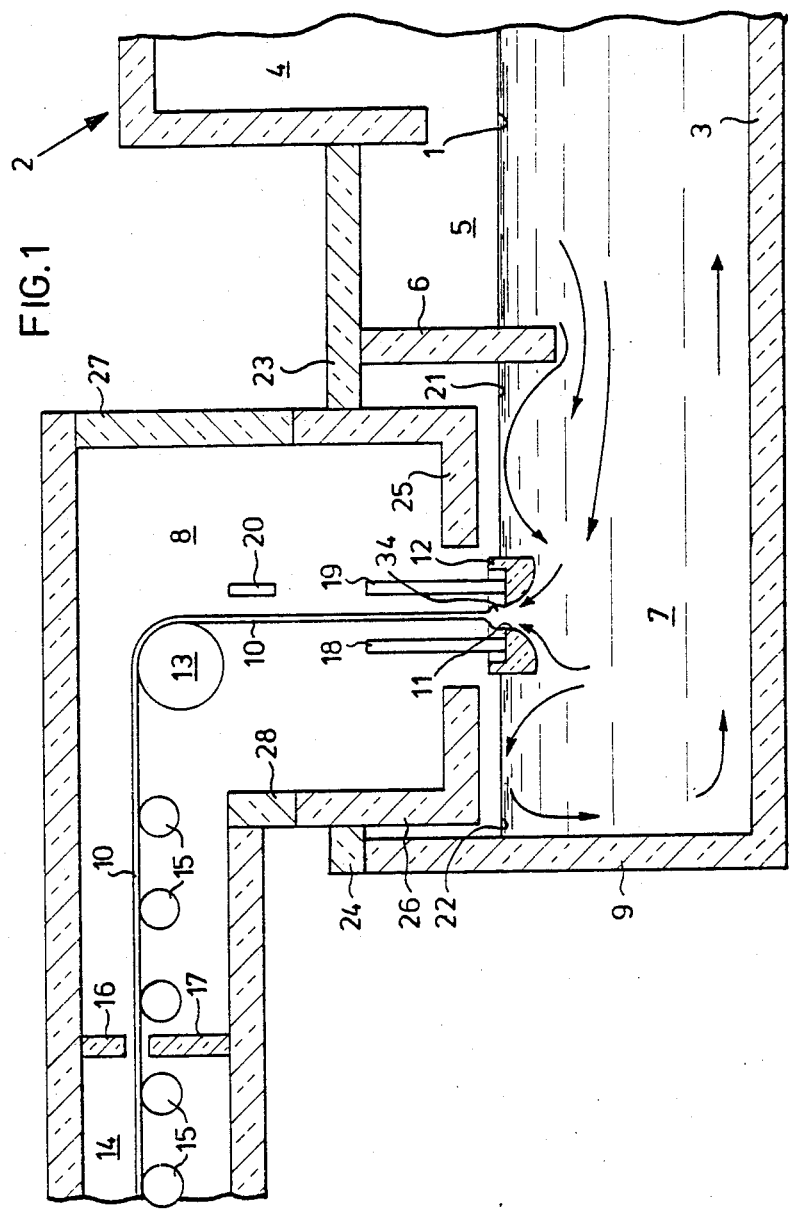
FIG. 1 is a schematic sectional side view through a first embodiment of glass manufacuring plant in accordance with the invention.

In FIG. 1 molten glass 1 is continued within a glass-melting tank furnace 2 having a sole wall 3 and is fed from a conditioning zone 4 of the furnace through a channel 5 beneath a bridge wall 6 into a drawing tank 7, at the base of a drawing chamber 8, whose downstream end is closed by a rear end wall 9. Glass is drawn upwardly as a continuous ribbon 10 from a slot 11 defined by a refractory device, here shown in the form of a one-piece debiteuse 12, which is partially immersed in the glass 1 in the drawing tank 7, and the ribbon is then folded over a bending roll 13 whence it passes to a horizontal annealing lehr 14.

Converyor rolls 15 are provided for conveying the ribbon 10 through the lehr 14.

The drawing chamber 8 is screened off from the lehr 14 by upper and lower screening walls 16, 17 which define a slot through which the ribbon 10 is conveyed. If desired the upper screening wall 16 may be formed as a flexible curtian, for example of asbestos or other suitable refractory material, and this can be allowed to brush against the ribbon 10 to provide protection for the drawing chamber against the ingress of dust from the annealing lehr 14. Such screening may alternatively be effected by generating a hot air curtain.

Located above the debiteuse 12 are a pair of coolers 18, 19 for cooling the ribbon 10 as it passes between them to the bending roll 13.

A heater (not shown) may be provided if required to ensure that the ribbon 10 is sufficiently soft to pass over the bending roll 13 without risk of breaking.

An optional cooler 20 for the front face of the ribbon as it rises to the bending roll 13 is shown in FIG. 1.

The debiteuse 12 defining the drawing slot 11 is spaced from the bridge wall 6 defining the upstream end of the drawing tank 7 and from the rear end wall 9 defining the downstream end of that tank to leave surface areas respectively 21, 22 of the glass in the drawing tank exposed. The flow pattern of currents in the glass in the drawing tank 7 is represented by arrows. Glass flows into the drawing tank 7 immediately beneath the bridge wall 6 and part of it is drawn up into the ribbon 10. Some of the glass flows on close to the rear end wall 9 where it is cooled so that it forms a sinking current which then flows slowly back to the conditioning zone 4 of the glass melting tank furnace 2 along the sole wall 3. The drawing tank 7 the feed channel 5 and the conditioning zone 4 of the tank furnace 2 have a common horizontal sole wall 3.

In FIG. 1 the spacing of the debiteuse 12 from the bridge wall 6 and the rear end wall 9 is very much greater than it is in the classical Fourcault process, and is sufficient to allow natural currents in the glass continuously to displace the glass beneath the surface regions 21, 22. By way of example, in a plant for producing a 2.8 m wide ribbon using a debiteuse 3.6 meters long and 420 mm wide with a central slot 3 meters long, the gap between the debiteuse 12 and the bridge wall 6 may be 1100 mm while that between the debiteuse 12 and the rear end wall 9 may be 700 mm. In a classical Fourcault process each of those gaps could be about 50 mm.

The bridge wall 6 and the rear end wall 9 are surmounted by covers 23, 24 for the upstream and downstream ends of the drawing chamber 8 and these meet up with upstream and downstream L-blocks 25, 26 carrying chamber end pieces 27, 28 connected to continuations of the roof and floor respectively of the annealing lehr 14. The horizontal lips of the L-blocks 25, 26 help to screen upper portions of the drawing chamber 8 from radiation from the body of molten glass 1 in the drawing tank 7 by reflecting that radiation downwardly so that the glass in the tank 7 is hotter and the chamber 8 cooler than would otherwise be the case.

The debiteuse 12 is held at a required depth in the molten glass in the drawing tank as shown in FIG. 2.

As shown in FIG. 2, feed pipes 29 are provided for circulating cooling fluid in the coolers 18, 19. The coolers are supported by these feed pipes 29 which project through openings 30 on side walls 31 of the drawing chamber 8. The pipes 29 are connected to brackets 32 fixed to the side walls 31 of the drawing chamber by means of threaded ties 33. The debiteuse 12 is buoyant in the molten glass 1 and is pressed down by the coolers 18, 19 so that the top of the slot 11 is below the surface level of that glass. In this way, hydrostatic pressure forces glass through the slot 11 so as to form a convex onion 34 (compare FIG. 1) from which the glass ribbon 10 is drawn. In operation, the level of the debiteuse 12 is adjusted during drawing so as to maintain that onion 34.

Also shown in FIG. 2 are two oblique rods 35 which have pincer-shaped ends 36 resting on the top of the debiteuse at the ends of the slot 11. The root of the ribbon 10 passes between the jaws of the pincers 36, and these pincers assist in determining the edges of the drawn ribbon.

Using a drawing machine substantially as illustrated in FIGS. 1 and 2 with a debiteuse having a slot 3 meters long, sheet glass has been drawn continuously to a thickness of 0.8 mm±0.05 mm over a continuous useful ribbon width of 2.5 meters. Using the same plant, sheet glass has been continuously drawn to a thickness of 0.4 mm±0.05 mm over a continuous useful ribbon width in excess of two metres. In each case, the drawn glass was of high planeity.

FIG. 3 shows a modification of the plant illustrated in FIGS. 1 and 2 in which the glass ribbon 10 is drawn up from a slot 11 in a debiteuse 12, between coolers 18, 19 which also serve to hold the debiteuse at a suitable level in molten glass 1 in a drawing tank 7, into a drawing chamber 8 whence the glass ribbon is passed to a vertical annealing lehr 37, the glass 10 being drawn upwardly between rollers 38. The drawing tank 7 is of such length that the ribbon 10 is drawn upwardly with its root spaced by at least 550 mm from each end wall 6, 9 to the drawing tank.

The depth of the molten glass in the drawing tank 7 was in the range 1.2 to 1.5 meters in each of the illustrated embodiments.

What is claimed is:

1. A sheet glass manufacturing process comprising: supplying molten glass from a glass melting tank furnace, where the molten glass is produced, to a drawing tank having an upstream end wall at the end of the drawing tank directed toward the tank furnace and a downstream end wall at the end of the drawing tank directed away from the tank furnace; positioning a refractory device provided with an elongated slot having a longitudinal center line in the drawing tank so that the refractory device is partially immersed in molten glass in the drawing tank to a sufficient depth such that the top of the slot is below the level of the surface of the molten glass in the drawing tank for causing molten glass to be forced upwardly through and out of the slot by hydrostatic pressure, and the longitudinal center line is spaced from each end wall, the refractory device further having a rim extending around the periphery of the device, spaced laterally from the slot, and projecting upwardly from the level of the top of the slot to a height above the level of the surface of the molten glass in the drawing tank, to form a region surrounding the top of the slot which is free of molten glass; and drawing molten glass upwardly in the form of a continuous ribbon from glass which has been forced out of the slot and into a drawing chamber located above the drawing tank; wherein the tank is dimensioned and the refractory device is located such that the longitudinal center line of the elongated slot is spaced by a distance of at least 550 mm from each end wall of the drawing tank and, during said step of drawing, a free glass surface is maintained in the drawing tank between the refractory device and each of the end walls of the tank, and the tank is so dimensioned that the glass surface to each side of the refractory device is at least 350 mm long measured in a direction normal to the plane of the upwardly drawn ribbon.

2. A process according to claim 1, wherein the center line of the slot is spaced from each of end wall by a distance of at least 700 mm.

3. A process according to claim 1, wherein the glass is drawn upwardly closer to the downstream end wall of the drawing tank than to the upstream end wall.

4. A process according to claim 1, wherein molten glass is fed to the drawing tank from a portion of the tank furnace containing molten glass to substantially the same depth as that in the drawing tank.

5. A process according to claim 4, wherein the depth of the glass in the drawing tank is substantially equal to the depth of the glass in the melting tank furnace.

6. A process according to claim 1, wherein the glass within molten drawing tank is maintained at a depth of at least 1 meter.

7. A process according to claim 1, further comprising folding the continuous ribbon about a bending roll located above the drawing tank and then passing the ribbon from the bending roll to a horizontal annealing lehr.

8. A process according to claim 1, further comprising adjusting the level of the refractory device during drawing of the glass.

9. A process according to claim 8, wherein the level of said refractory device is adjusted in order to maintain a convex bulb of glass at the top of the slot from which the ribbon is drawn.

10. A process according to claim 1, wherein the glass surface to each side of the refractory device is at least 500 mm long measured in a direction normal to the plane of the upwardly drawn ribbon.

11. A process according to claim 1, wherein the glass ribbon is drawn to a thickness of 3 mm or less.

12. Sheet glass produced by a process according to claim 1.

13. A process according to claim 1 wherein molten glass within the drawing tank is maintained at a depth of 1.2 to 1.5 meters, inclusive.

14. A process according to claim 1 wherein the drawing chamber has an upper region and a lower region, the lower region being disposed immediately above molten glass in the drawing tank, and further comprising reflecting heat radiated from the surface of the molten glass in the drawing tank downwardly in the lower region of the drawing chamber.

15. A sheet glass manufacturing plant comprising: a glass melting tank furnace for producing molten glass; a drawing tank connected to the furnace to receive a continuous supply of molten glass therefrom, said drawing tank having an upstream end wall at the end of said drawing tank directed toward said furnace and a downstream end wall at the end of said drawing tank remote from said furnace; a drawing chamber disposed above said drawing tank; a refractory device provided with an elongated slot having a longitudinal center line, said device being disposed in said drawing tank to be partially immersed in molten glass in said tank to a sufficient depth such that the top of said slot is below the level of the surface of molten glass in said drawing tank and so that molten glass is forced upwardly through said slot by hydrostatic pressure, said refractory device further having a rim extending around the periphery of said device, spaced laterally from said slot, and projecting upwardly from the level of the top of said slot to a height which will be above the level of the surface of the molten glass in said drawing tank when said refractory device is partially immersed in the molten glass, to form a region surrounding the top of the slot which is free of molten glass when molten glass is being drawn upwardly in the form of a continuous ribbon; and means from drawing molten glass upwardly in the form of a continuous ribbon from said slot into said drawing chamber; wherein said drawing tank is dimensioned and said refractory device is located such that the longitudinal center line of said slot is spaced by a distance of at least 550 mm from each said end wall of said drawing tank, and said refractory device is spaced from each of said upstream and downstream end walls by a distance of at least 350 mm.

16. A plant according to claim 15, wherein the center line leading along said slot is so spaced from each of said end walls by a distance of at least 700 mm.

17. A plant according to claim 15, wherein the distance between said upstream end wall and the slot center line is greater than the distance between said downstream end well and that line.

18. A plant according to claim 15, wherein said means for drawing comprise a bending roll located in said drawing chamber above said drawing tank and about which the ribbon can be folded, and said plant further comprises a horizontal annealing lehr for receiving the ribbon of drawn glass after its folding about said bending roll.

19. A plant according to claim 15, wherein said refractory device is mounted so that its level within said drawing tank is adjustable.

20. A plant according to claim 15, wherein said refractory device is so spaced from each of said end walls by a distance of at least 500 mm.

21. A plant according to claim 15, wherein said refractory device is in the form of a one-piece debiteuse.

22. A plant according to claim 15, wherein said drawing chamber has an upper region and a lower region, and further comprising means in said lower region of said drawing chamber for downwardly reflecting heat radiating from the surface of molten glass within said drawing tank.

23. A plant according to claim 15 wherein said drawing tank has a sole wall and said melting tank furnace includes a portion directed toward said drawing tank, from which molten glass is supplied to said drawing tank, said tank furnace portion having a sole wall at substantially the same level as said sole wall of said drawing tank.

24. A plant according to claim 15 wherein said drawing tank has a sole wall and said melting tank furnace comprises a melting tank having a sole wall at substantially the same level as said sole wall of said drawing tank.

25. A plant according to claim 15 wherein said drawing tank is dimensioned to contain molten glass to a depth of at least 1 meter.

26. A plant according to claim 15 wherein said drawing tank is dimensioned to contain molten glass to a depth of 1.2 to 1.5 meters, inclusive.

* * * * *